United States Patent
Ruppert et al.

(10) Patent No.: US 7,866,423 B2
(45) Date of Patent: Jan. 11, 2011

(54) LOW FLOOR DRIVE UNIT ASSEMBLY FOR AN ELECTRICALLY DRIVEN VEHICLE

(75) Inventors: Malcolm F. Ruppert, Hebron, OH (US); Lawrence Doyle Brill, Westerville, OH (US); William Carl Sullivan, Newark, OH (US); Glen E. Swanson, Westerville, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 1059 days.

(21) Appl. No.: 11/210,461

(22) Filed: Aug. 24, 2005

(65) Prior Publication Data

US 2006/0058145 A1  Mar. 16, 2006

Related U.S. Application Data

(63) Continuation of application No. 09/781,795, filed on Feb. 12, 2001, now Pat. No. 7,083,015, which is a continuation of application No. 08/801,531, filed on Feb. 18, 1997, now Pat. No. 6,276,474.

(51) Int. Cl.
  *B60K 1/02* (2006.01)

(52) U.S. Cl. .................................. 180/65.1; 180/65.6

(58) Field of Classification Search ............. 180/65.1, 180/65.4, 65.6, 65.5, 57, 60, 291, 292; 296/64, 296/178; 475/5
See application file for complete search history.

(56) References Cited

U.S. PATENT DOCUMENTS

| | | | | |
|---|---|---|---|---|
| 718,097 A | * | 1/1903 | Crompton | 180/303 |
| 1,540,526 A | * | 6/1925 | Anglada | 180/57 |
| 1,660,669 A | * | 2/1928 | Froesch | 475/5 |
| 1,735,404 A | * | 11/1929 | Fellows | 180/65.6 |
| 2,589,863 A | * | 3/1952 | Quartullo | 180/65.4 |
| 3,812,928 A | * | 5/1974 | Rockwell et al. | 180/65.5 |
| 3,902,565 A | * | 9/1975 | Farrall | 180/65.1 |
| 4,270,622 A | * | 6/1981 | Travis | 180/65.4 |
| 4,986,190 A | * | 1/1991 | Harsy | 105/4.4 |

FOREIGN PATENT DOCUMENTS

FR 2507550 * 12/1982

OTHER PUBLICATIONS

Toboldt, W. K.; Johnson, L., "Goodheart-Willcox Automotive Encyclopedia" 1977, Goodheart-Willcox Company, pp. 597-598.*

* cited by examiner

*Primary Examiner*—Frank B Vanaman
(74) *Attorney, Agent, or Firm*—Carlson, Gaskey & Olds

(57) ABSTRACT

An automotive vehicle drive unit assembly which is located near the sides of a vehicle includes a first driving axle shaft, a second driving axle shaft, a first gear box, a second gear box, a first electric motor, and a second electric motor. The first driving axle shaft drives a first wheel hub of the vehicle and the second driving axle shaft drives a second wheel hub. Together the first and second driving axle shafts define an axis of rotation about which the first and second wheel hubs rotate. The first gear set drives the first wheel and the second gear set drives the second wheel. A first electric motor is mounted in an angular relationship relative to the axis of rotation and drives the first gear set. A second electric motor is mounted in an angular relationship relative to the axis of rotation and drives the second gear set. A plurality of electric motors can be used to drive each wheel hub.

12 Claims, 4 Drawing Sheets

LOW FLOOR DRIVE UNIT ASSEMBLY FOR AN ELECTRICALLY DRIVEN VEHICLE

RELATED APPLICATIONS

This application is a continuation of Ser. No. 09/781,795 filed on Feb. 12, 2001 now U.S. Pat. No. 7,083,015, which is a continuation of Ser. No. 08/801,531 filed on Feb. 18, 1997 now U.S. Pat. No. 6,276,474.

BACKGROUND OF THE INVENTION

This invention relates to a unique drive arrangement for electrically driving wheels of a vehicle in such a way that a floor of the vehicle may be lower than was the case in the prior art.

Mass transit vehicles, such as a bus or trolley car, typically have seats aligned at the lateral sides of the vehicle, with a central aisle extending along the vehicle. The seats are typically at a higher vertical location than the aisle, and thus cover the wheels. It would be desirable to have the aisle positioned relatively low to the ground. This would provide increased passenger space within the body of the vehicle, and may allow the designer to reduce the overall height of the mass transit vehicle. Other advantages to having a lower floor position include improved handicapped access and greater ease in the loading and unloading of passengers.

Mass transit vehicles typically have several axles which support and drive or steer the vehicle. If the axle is a driving axle, then electric motors can be used to generate torque to drive the wheels. In a typical configuration, a centrally located electric motor drives two opposed wheels at the sides of the vehicle by way of a conventional axle. Usually, transmissions or drive shafts extend from the centrally located electric motor to the axle.

In the prior art, there are relatively large motor, transmission, or axle elements directly below the center of the vehicle. The aisle is typically in the center of the vehicle and normally goes over the axle, thus requiring the floor of the aisle to be relatively high. One known bus moves the floor up by steps over the axle. It is undesirable, however, to have passengers climb steps to reach the aisle and seating areas.

SUMMARY OF THE INVENTION

The subject invention relates to an automotive vehicle drive unit assembly which includes a first driving axle and a second driving axle which together define an axis of rotation. The drive unit assembly further includes a first wheel hub and a second wheel hub which are driven about the axis of rotation. A first gear set drives the first wheel hub and a second gear set drives the second wheel hub. A first electric motor is mounted at an angle relative to the axis of rotation of the first driving axle and drives the first gear set, and a second electric motor is mounted at an angle relative to the axis of rotation of the second driving axle and drives the second gear set.

This invention improves packaging and increases passenger compartment size by moving the electric motors to the sides of the vehicle. This allows the interior vehicle floor to be lowered between the motors resulting in improved utilization of the passenger compartment. Also, the flexibility of mounting the electric motors at various angles with respect to the axis of rotation of the first and second driving axles results in flexible packaging designs for other vehicle components.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
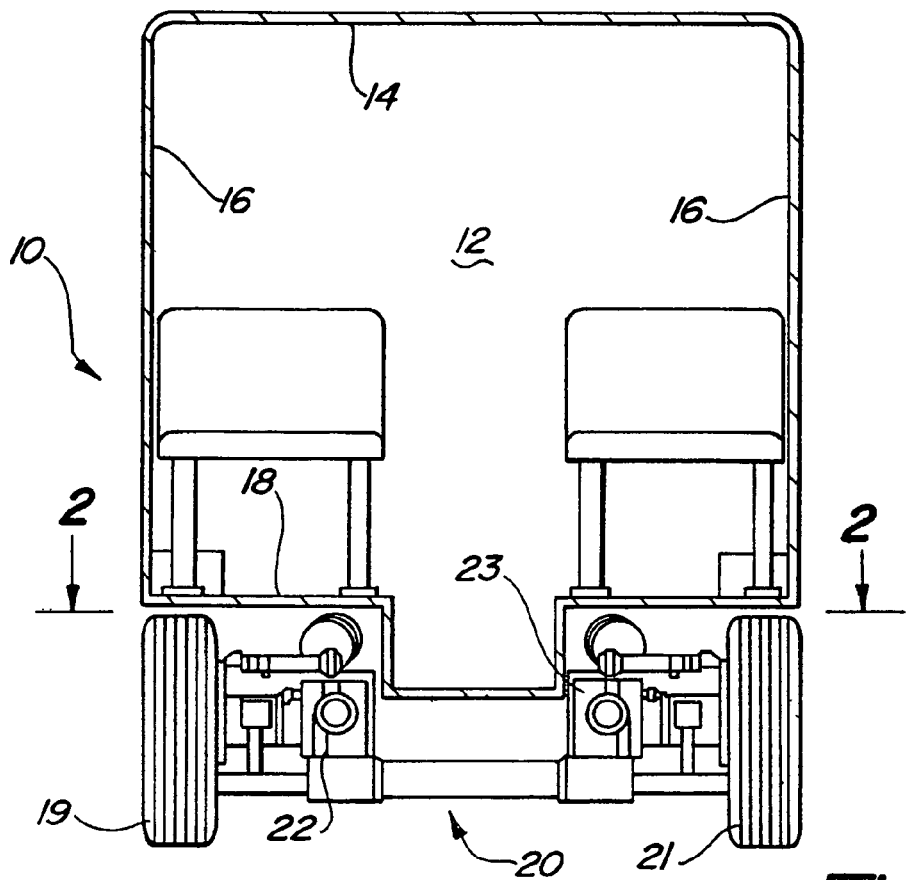
FIG. 1 is a cross sectional view of a vehicle incorporating the subject invention.

Referring to the Figures, wherein like numerals indicate like or corresponding parts throughout the several views, an automotive vehicle is shown generally at 10. As shown in FIG. 1, automotive vehicle 10 includes a passenger compartment 12 defined by a roof 14, two side walls 16, and a vehicle floor 18. First and second wheels 19,21 are driven by an automotive vehicle drive unit assembly, generally shown at 20, which has a first unit 22 and a second unit 23. It should be understood that vehicle 10 is typically provided with a pair of drive units and several pairs of wheels.

Figure 3:
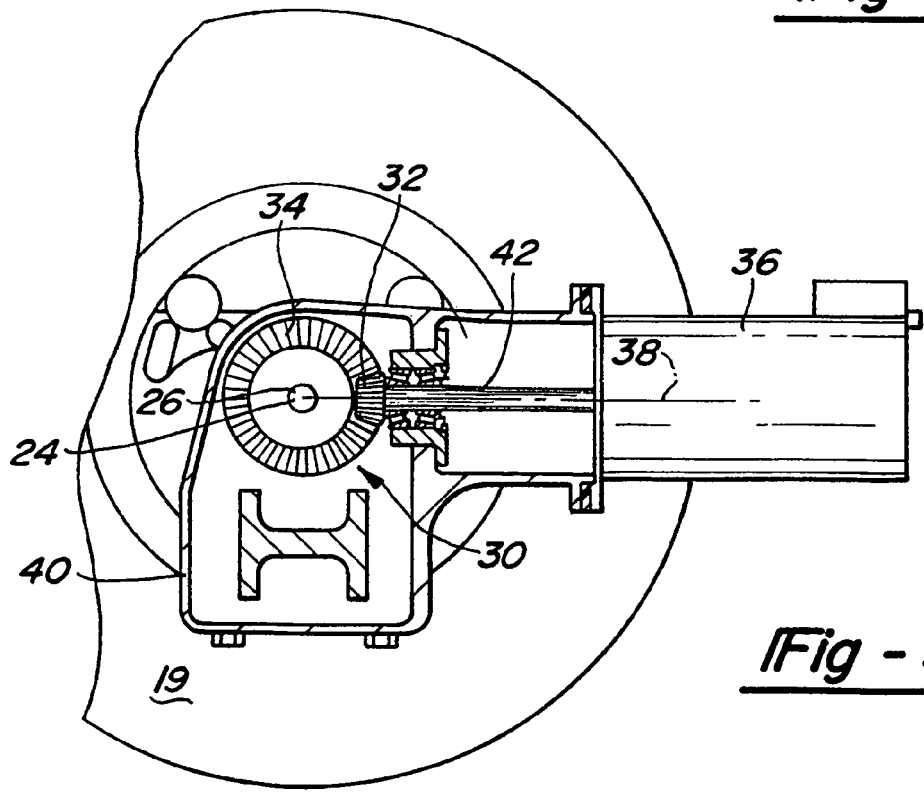
FIG. 3 is a fragmentary view from the inside of the left wheel hub as shown in FIG. 2, partially broken away and in cross section, and showing a first embodiment of an electric motor arrangement.
Figure 2A:
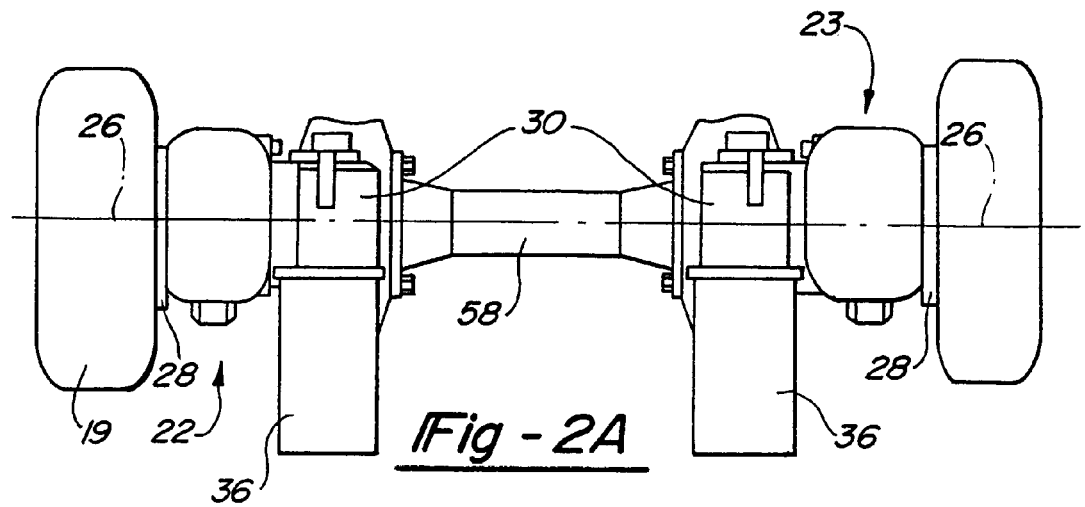
FIG. 2A is a cross sectional view taken along line 2-2 of FIG. 1, showing a first electric motor arrangement.

As shown in FIG. 2A, the first unit 22 and second unit 23 define an axis of rotation 26. As shown in FIG. 3, a first driving axle shaft 24 drives a first wheel hub 128 which rotates about the axis of rotation 26 of the first driving axle shaft 24.

A first gear set 30, located adjacent to the first wheel 19, is comprised of a pinion gear 32 and a ring gear 34 which together drive the first wheel hub 28. A first electric motor 36, defining a motor axis of rotation 38, is mounted at a non-parallel angle relative to the axis of rotation 26 of the first driving axle shaft 24. The first electric motor 36 is shown mounted in a horizontal position such that the motor axis of rotation 38 is parallel to the vehicle floor 18 and is perpendicular to the axis of rotation 26 of the first driving axle shaft 24.

As shown in FIG. 2A, drive unit assembly 20 further includes a second unit 23 comprising a second driving axle shaft 24, a second wheel hub 28, a second gear set 30, and a second electric motor 36. It is understood that the second unit 23 is a mirror image of the first unit 22. A beam 58 provides a fixed housing extending between the first 22 and second 23 units.

Figure 2B:
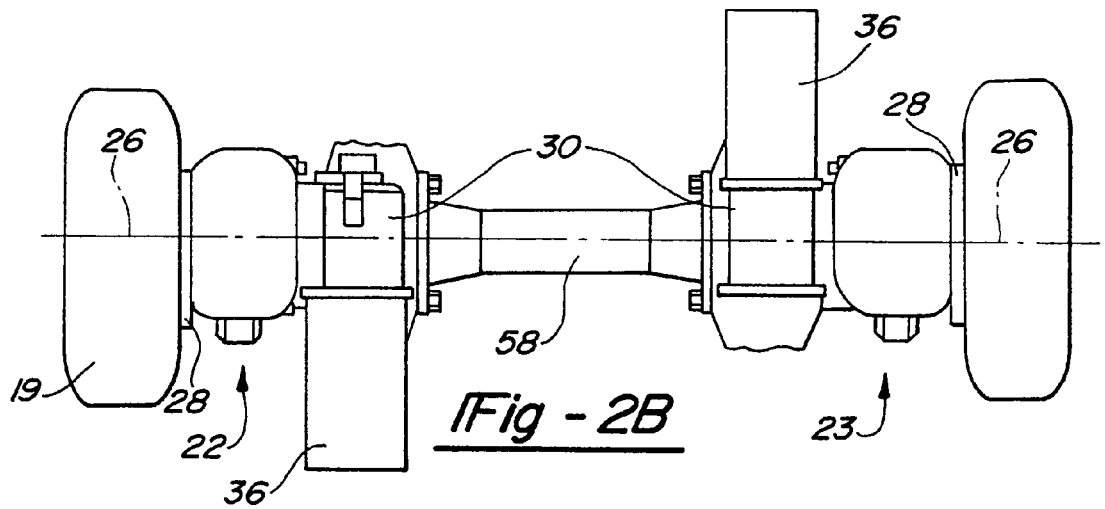
FIG. 2B is a view like FIG. 2A, but showing an alternative electric motor arrangement.

The first 36 and second 36 electric motors can be mounted in various different positions relative to each other. As shown in FIG. 2A, the first 36 and second 36 electric motors can be mounted in a generally horizontal position with both electric motors 36 extending forwardly from the beam 58. Where packaging would allow, the electric motors 36 can also be mounted such that they both extend rearwardly from the beam 58. As shown in FIG. 2B, the first 36 and second 36 electric motors can be mounted in a generally horizontal position with the first electric motor 36 extending in a forwardly direction relative to beam 58 while the second electric motor 36 extends in a rearwardly direction relative to beam 58. Arranging the configuration so that one electric motor 36 extends forwardly while the other electric motor 36 extends rearwardly can resolve electric motor weight balance issues that arise when both motors extend in the same direction from the beam 58.

Figure 4:
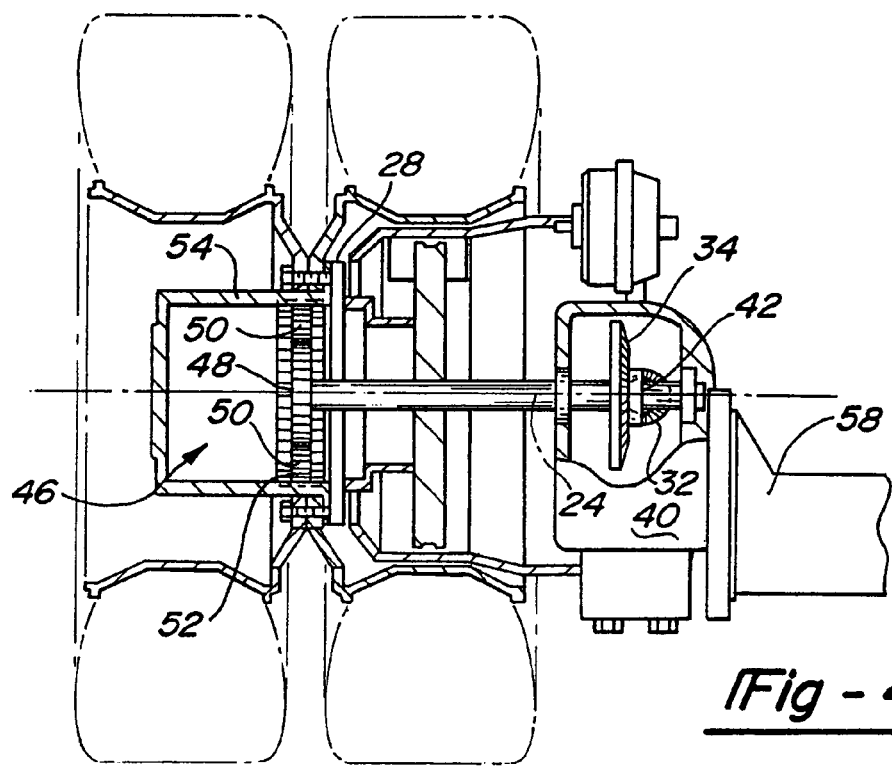
FIG. 4 is a cross section view from the front of the left wheel as shown in FIG. 3, and showing the first embodiment of an electric motor mounting arrangement.

As can be seen in FIGS. 3 and 4, a first gear box 40 houses the first gear set 30 and is rigidly connected to the first electric motor 36. A motor drive shaft 42 extends from the electric motor 36, along the motor axis of rotation 38, and drives the pinion gear 32. The pinion gear 32 meshes with the ring gear 34 which rotates about the axis of rotation 26 of the driving axle shaft 24. As the ring gear 34 rotates, it drives the first driving axle shaft 24 which turns the wheel hub 28. As can be seen in FIG. 4, first gear box 40 is fixed to beam 58.

Figure 8:
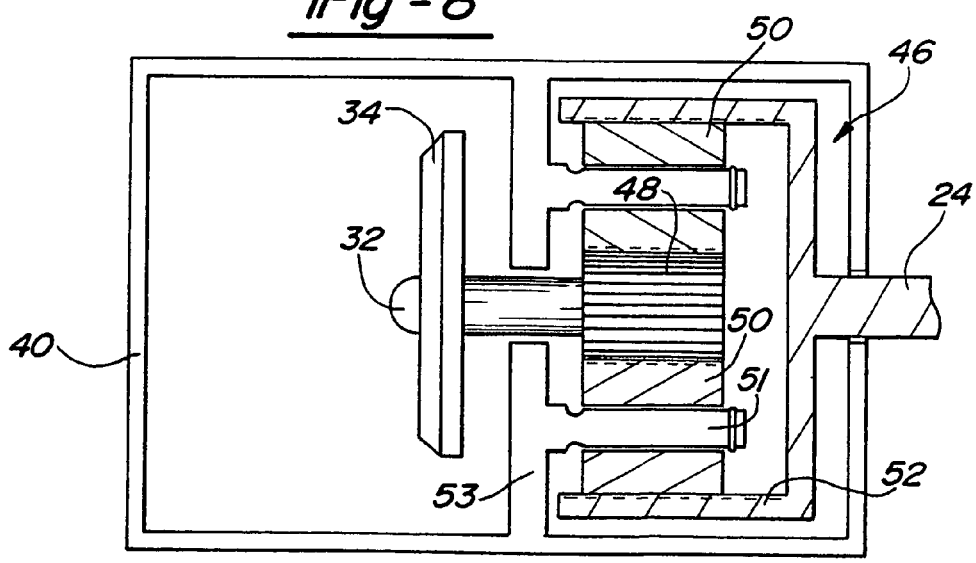
FIG. 8 is a cross sectional view of a gear box showing an alternative embodiment incorporating a planetary gear set.

A planetary gear set, shown generally at 46 in FIG. 4, can be used to achieve greater overall gear reduction. The planetary gear set 46 can either be located adjacent to the wheel hub 28 or can be incorporated into the gear box 40. The planetary gear set 46 shown in FIG. 4 is located adjacent to the first wheel hub 28 and is driven by the first driving axle shaft 24. The planetary gear set 46 shown in FIG. 8 is incorporated into the gear box 40. Regardless of its location, the planetary gear set 46 includes a sun gear 48, planet gears 50, and a ring gear hub 52. Each planet gear 50 is attached to a single planetary spider 53 by a corresponding planet pin 51, thus forming a planet gear assembly, as shown in the enlarged view of the planetary gear set 46 in FIG. 8. The planet gear assembly is inserted into the ring gear hub 52 such that the teeth of the planet gears 50 mesh with the teeth of the ring gear hub 52.

In a typical configuration there are three planet gears 50 in a planet gear assembly but it is understood that a different number of planet gears 50 can be used. When the planetary gear set 46 is located adjacent to the wheel hub 28, as shown in FIG. 4, the sun gear 48 is attached to and driven by the first driving axle shaft 24. As the sun gear 48 rotates, it meshes simultaneously with each of the planet gears 50 in the planet gear assembly. The planet gears 50 mesh with the ring gear hub 52 which results in the turning of the first wheel hub 28. The entire planetary gear set 46 is housed within a planetary hub 54 located adjacent to the first wheel hub 28. It is understood that the drive unit assembly 20 does not require a planetary gear set 46 for operation. The planetary gear set 46 is an optional feature of the drive unit assembly 20.

As shown in FIG. 8, the planetary gear set 46 can also be incorporated into the gear box 40 instead of being located adjacent to the wheel hub 28. Incorporating the planetary gear set 46 into the gear box 40 is a unique location for the planetary gear set 46. Typically, this location has been used by a differential which includes a ring gear and a pinion gear which drive axle shafts which in turn drive the wheels. With independent electric motors 36 there is no need for a differential or for any direct mechanical link between opposing wheels. By incorporating the planetary gear set 46 into the gear box 40, the need for a planetary hub 54 is eliminated which decreases the vehicle weight, gives a broader selection of wheel equipment and wheel end features, and reduces overall cost.

Figure 5:
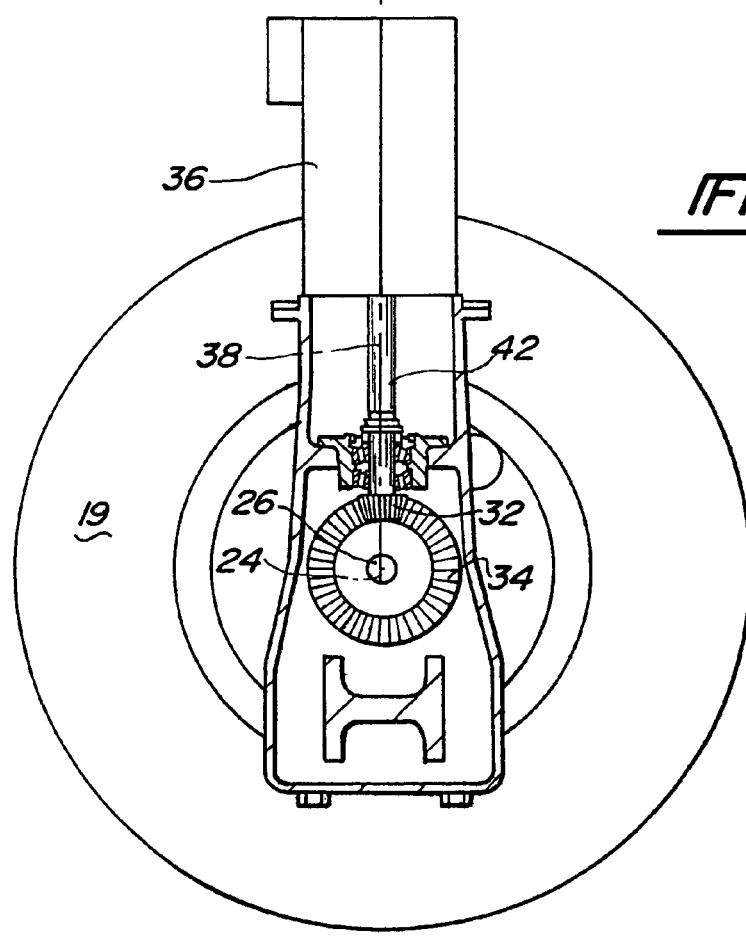
FIG. 5 is a view like FIG. 3 but showing an alternative electric motor mounting arrangement.
Figure 6:
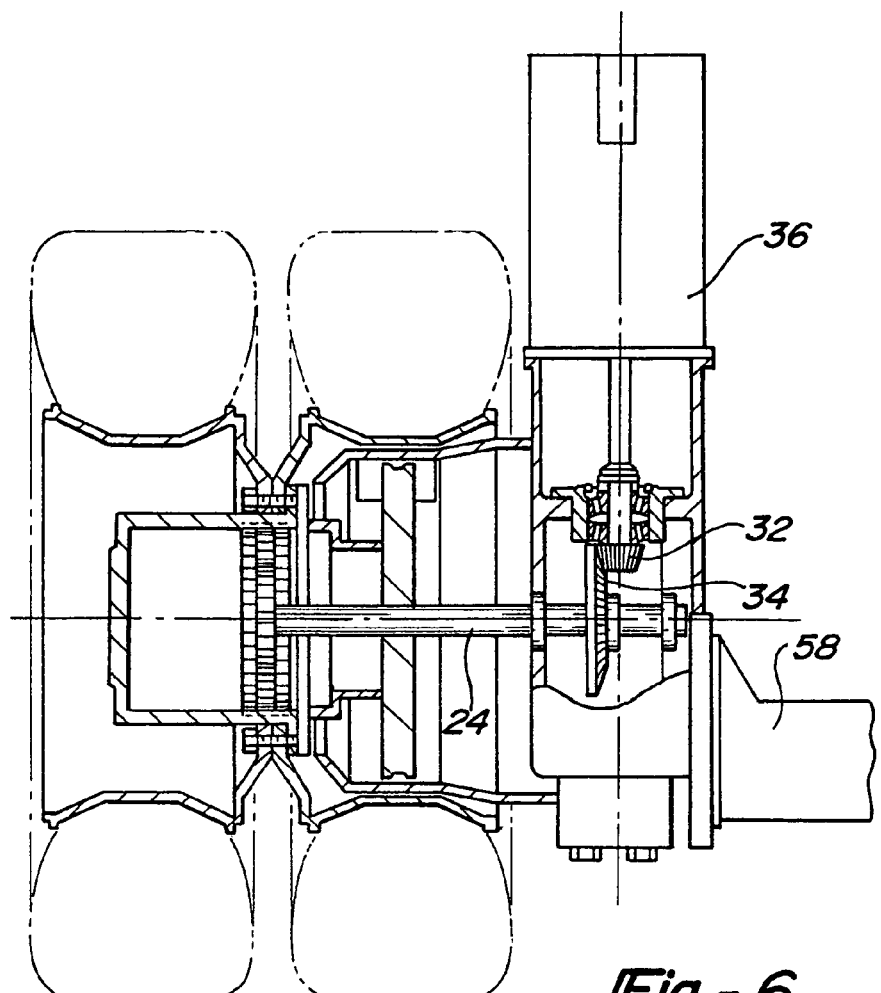
FIG. 6 is a view like FIG. 4 but showing the alternative electric motor mounting arrangement.

FIGS. 5 and 6 show an alternate embodiment of the mounting arrangement for the first electric motor 36. The first electric motor 36 is shown mounted in a vertical position such that the motor axis of rotation 38 is perpendicular to the vehicle floor 18 and is perpendicular to the axis of rotation 26 of the first driving axle shaft 24. In a typical configuration, the first electric motor 36 is mounted either in a horizontal or vertical position. However, the electric motor 36 can be mounted at any angle with respect to the vehicle floor 18 and the axis of rotation 26 of the first driving axle shaft 24.

Figure 7:
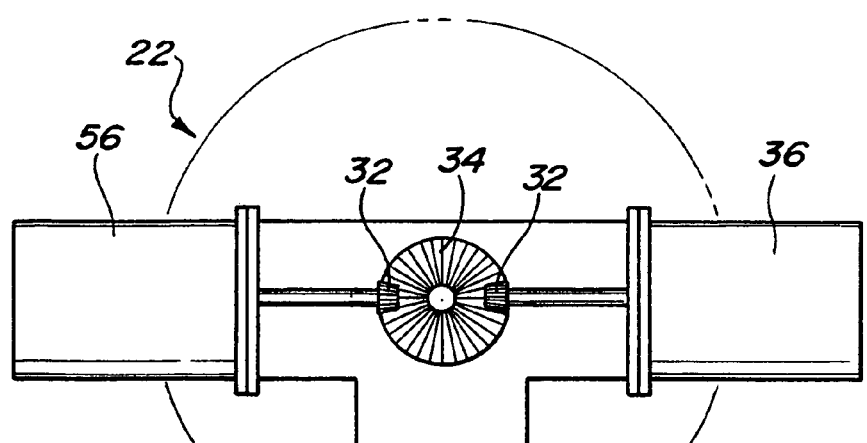
FIG. 7 is a view like FIG. 3 but showing an additional electric motor.

FIG. 7 shows an alternate embodiment of the drive unit assembly 20 in which the first unit 22 includes a third electric motor 56, in parallel driving relationship with the first electric motor 36. The third electric motor 56 is also used to drive the first gear set 30. The second unit 23 is a mirror image of the first unit 22 and includes a fourth electric motor 56, in parallel driving relationship with the second electric motor 36. The fourth electric motor 56 is use to drive the second gear set 30. The use of a third 56 and fourth electric motor 56, where packaging space is available, allows smaller gears and motors to be used, thus reducing the necessary size for the system.

With the present invention, the benefits as shown in particular in FIG. 1 are achieved. By mounting the motors at the sides of the vehicle, the center of the vehicle floor may be lowered significantly than compared to the prior art. In addition, since the motors themselves are connected at a non-parallel angle to drive the wheels, they do not extend towards the center of the vehicle from the wheel for any undue amount. Thus, the lower floor can begin at a laterally outer position. If the motors extended on an axis parallel to the axis of the wheel, the motor would require a higher floor for more of the lateral width of the vehicle.

Another method of mounting the motors for the present invention is disclosed in U.S. Pat. No. 5,924,504 entitled "Suspension Drive Unit Assembly for an Electrically Driven Vehicle." Another mounting of the motor relative to the axle of the wheel hub is disclosed in U.S. Pat. No. 5,878,830 entitled "Space Saving Connection for electric drive Motor to wheel Hub".

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A wheel drive unit assembly comprising:
    a driving axle shaft defining a lateral axis of rotation;
    a wheel component driven by said driving axle shaft about said lateral axis of rotation;
    a gear drive for driving said wheel component wherein said gear drive includes a pinion gear in direct driving engagement with a ring gear;
    an electric motor for driving said gear drive, said electric motor defining a longitudinal axis of rotation that intersects said lateral axis of rotation, and wherein said electric motor includes a motor output shaft that rotates about said longitudinal axis of rotation; and a planetary gear set driven by said gear drive about said lateral axis of rotation wherein said planetary gear set includes a sun gear mounted for rotation with said ring gear, and a plurality of planet gears in meshing engagement with said sun gear and a planetary ring gear hub.

2. The wheel drive unit assembly as set forth in claim 1 wherein said pinion gear is supported by said motor output shaft for rotation about said longitudinal axis of rotation, and wherein said ring gear is driven by said pinion gear about said lateral axis of rotation.

3. The wheel drive unit assembly as set forth in claim 1 wherein said gear drive is solely comprised of said pinion gear and said ring gear.

4. The wheel drive unit assembly as set forth in claim 1 wherein said ring gear and said sun gear are mounted to a common shaft.

5. The wheel drive unit assembly as set forth in claim 1 wherein said pinion gear is supported by said motor output shaft for rotation about said longitudinal axis of rotation, said ring gear is driven by said pinion gear about said lateral axis of rotation, and said sun gear is driven by said ring gear about said lateral axis of rotation.

6. The wheel drive unit assembly as set forth in claim 1 wherein said longitudinal axis of rotation is perpendicular to said lateral axis of rotation.

7. The wheel drive unit assembly as set forth in claim 1 wherein said electric motor is mounted in a horizontal configuration to extend longitudinally from said lateral axis of rotation.

8. The wheel drive unit assembly as set forth in claim 1 wherein said planetary gear set, said electric motor, and said gear drive cooperate to provide a discrete drive unit for driving one vehicle wheel independently from other vehicle wheels.

9. The wheel drive unit assembly as set forth in claim 1 wherein said planetary gear set comprises a single planetary gear set and said gear drive comprises a single gear set that is solely comprised of a pinion gear and a ring gear.

10. A vehicle drive unit assembly comprising:
first and second driving axle shafts defining a lateral axis of rotation;
first and second wheel components driven by said first and said second driving axle shafts, respectively, about said lateral axis of rotation;
a first gear set that drives said first wheel component;
a second gear set that drives said second wheel component;
a first electric motor having a first motor output shaft that drives said first gear set, said first motor output shaft defining a first longitudinal axis of rotation that is transverse to said lateral axis of rotation;
a second electric motor having a second motor output shaft that drives said second gear set, said second motor output shaft defining a second longitudinal axis of rotation that is transverse to said lateral axis of rotation and is laterally spaced apart from said first longitudinal axis of rotation, and wherein said first and said second longitudinal axes of rotation intersect said lateral axis of rotation;
first and second planetary gear sets driven by said first and said second gear sets, respectively, about said lateral axis of rotation;
wherein said first gear set includes a first pinion gear and a first ring gear, said first pinion gear driven by said first motor output shaft for rotation about said first longitudinal axis of rotation, and said first ring gear driven by said first pinion gear about said lateral axis of rotation;
wherein said first planetary gear set includes a first sun gear coaxial with said first ring gear for rotation about said lateral axis of rotation;
wherein said second gear set includes a second pinion gear and a second ring gear, said second pinion gear driven by said second motor output shaft for rotation about said second longitudinal axis of rotation, and said second ring gear driven by said second pinion gear about said lateral axis of rotation; and
wherein said second planetary gear set includes a second sun gear coaxial with said second ring gear for rotation about said lateral axis of rotation.

11. The vehicle drive unit assembly as set forth in claim 10 wherein said first sun gear and said first ring gear are supported on a first common shaft, and wherein said second sun gear and said second ring gear are supported on a second common shaft.

12. A vehicle drive unit assembly comprising:
first and second driving axle shafts defining a lateral axis of rotation;
first and second wheel components driven by said first and said second driving axle shafts, respectively, about said lateral axis of rotation;
a first gear set that drives said first wheel component;
a second gear set that drives said second wheel component;
a first electric motor having a first motor output shaft that drives said first gear set, said first motor output shaft defining a first longitudinal axis of rotation that is transverse to said lateral axis of rotation;
a second electric motor having a second motor output shaft that drives said second gear set, said second motor output shaft defining a second longitudinal axis of rotation that is transverse to said lateral axis of rotation and is laterally spaced apart from said first longitudinal axis of rotation;
first and second planetary gear sets driven by said first and said second gear sets, respectively, about said lateral axis of rotation;
wherein said first gear set includes a first pinion gear and a first ring gear, said first pinion gear driven by said first motor output shaft for rotation about said first longitudinal axis of rotation, and said first ring gear driven by said first pinion gear about said lateral axis of rotation;
wherein said first planetary gear set includes a first sun gear coaxial with said first ring gear for rotation about said lateral axis of rotation;
wherein said second gear set includes a second pinion gear and a second ring gear, said second pinion gear driven by said second motor output shaft for rotation about said second longitudinal axis of rotation, and said second ring gear driven by said second pinion gear about said lateral axis of rotation; and
wherein said second planetary gear set includes a second sun gear coaxial with said second ring gear for rotation about said lateral axis of rotation, and wherein said first planetary gear set is positioned axially between said first motor output shaft and said first wheel component, and wherein said second planetary gear set is positioned axially between said second motor output shaft and said second wheel component.

* * * * *